April 27, 1954     L. J. WILLMOTT     2,677,087
ELECTRIC MOTOR CONTROL

Filed April 15, 1952     2 Sheets-Sheet 1

INVENTOR.
LEO J. WILLMOTT
BY Oberlin & Limbach
ATTORNEYS

INVENTOR.
LEO J. WILLMOTT
BY
Oberlin & Limbach
ATTORNEYS

Patented Apr. 27, 1954

2,677,087

UNITED STATES PATENT OFFICE 2,677,087

ELECTRIC MOTOR CONTROL

Leo J. Willmott, Stow, Ohio, assignor to National Rubber Machinery Company, Akron, Ohio, a corporation of Ohio Application April 15, 1952, Serial No. 282,395

6 Claims. (Cl. 318—212)

The present invention, while indicated as relating generally to improvements in an electric motor control, has to do not only with an improved control device but also with a new method for effecting quick and accurate braking of a multi-speed A. C. induction motor so that the mechanism actuated thereby will be brought to rest at a precise, desired position.

Hitherto, the following methods of electric braking of induction motors have been employed, viz.:

(1) Plugging, wherein reverse power application causes the motor to exert torque in a direction opposite to its direction of rotation to thereby effect quick stopping thereof. Of course when the motor reaches zero speed it can be arranged either to stop or to rotate in the reverse direction.

(2) Dynamic braking, wherein the motor having the power source disconnected therefrom and a D. C. excitation voltage instantaneously applied is operated as a generator and is loaded by an induced current flowing through its squirrel cage rotor winding.

(3) Regenerative braking, wherein the motor acts as a generator as in dynamic braking except that the power source is not disconnected, the motor being loaded by feeding its generated power into the line.

The foregoing methods for automatically braking electric motors, particularly A. C. induction motors, are utilized to allow high speed operation with minimum time loss in stopping or retarding or reversing the apparatus driven by the motor. Positive stops can not be provided in most instances due to the inertia of the machine parts actuated by the motor. In addition, in some motor driven machines it is necessary to instantly stop the operation in order to avoid personal injury to operators.

In the present case, the improved electric motor control device herein and the method of controlling an electric motor has utility in, for example, automatic bias cutting machines where extreme accuracy of ply stock cuts for tire building is required and also for positioning of tire building machine drums for obtaining one revolution at the time of applying each of the ply stock layers and for accurate indexing of the drum for uniform distribution of the ply stock splices in the interest of obtaining a tire of balanced construction.

Accordingly, it is one principal object of this invention to provide improvements in an electric motor control device and in the method of control thereof by which quick and precision stopping is achieved.

Another object of this invention is to provide an improved electric motor control device and method whereby a multispeed A. C. induction motor may be operated at an additional crawling or creeping speed much less than the plurality of speeds afforded by the windings thereof.

Another object of this invention is to provide an improved electric motor control device and method in which the motor is of conventional multispeed A. C. induction type capable of operation at high speed and at one or more lower speeds and wherein the crawling or creeping speed aforesaid is obtained by impressing a D. C. voltage on the high speed winding while A. C. is impressed on a lower speed winding.

Another object of this invention is to provide an improved electric motor control device and method in which quick stopping of a multispeed A. C. induction motor for precision positioning of devices actuated thereby is achieved by disconnecting the A. C. excitation from the low speed winding aforesaid while continuing the D. C. excitation of the high speed winding. In this way the motor stops instantaneously from the crawling or creeping speed upon disconnecting of such A. C. excitation.

Another object of this invention is to provide a braking device and method for multispeed A. C. induction motors in which rapid stopping and precise positioning is effected by combined regenerative braking and direct current excitation of a winding of an A. C. motor, hereinafter referred to as dynamic braking, to achieve a slowly moving or crawling speed followed by dynamic braking alone which operates to instantaneously stop the motor.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 1:
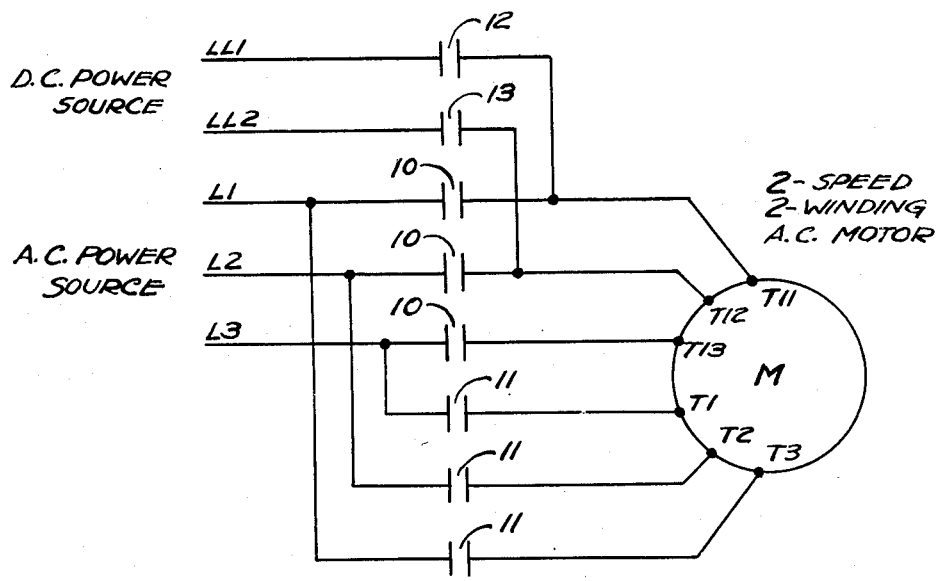
Fig. 1 is a schematic wiring diagram of a two-speed, two-winding A. C. induction motor with the present control device operatively associated therewith.
Figure 1:
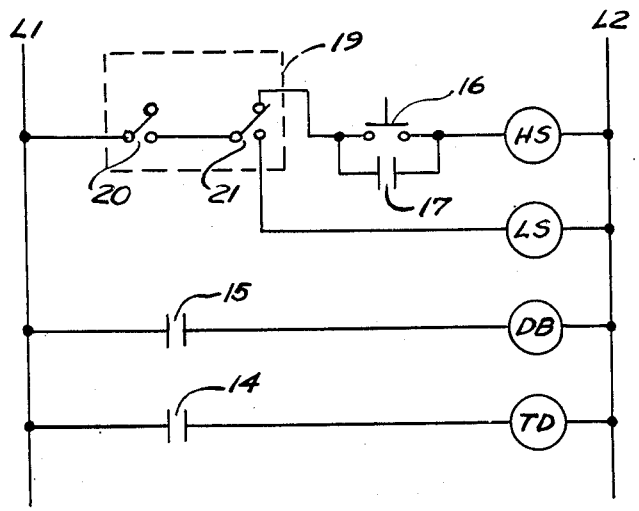

Referring now more particularly to the drawing and first to Fig. 1 thereof, the electric motor M is in this example a standard two-speed, two-winding A. C. induction motor, the two windings thereof having terminals T1, T2, T3, and T11, T12, T13 respectively connected to an A. C. power source L1, L2, L3, the windings being alternately energized by alternately opening and closing the normally open high speed and low speed contactors 10 and 11 which are respectively actuated to closed position by the high speed and low speed relay coils HS and LS. Dynamic braking is achieved by D. C. excitation of the high speed winding, the D. C. power source LL1 and LL2 being connected in one phase of the high speed winding. There are normally open contactors 12 and 13 in said D. C. power lines closed by energization of the dynamic braking relay coil DB.

In addition to the high speed, low speed, and dynamic braking relay coils HS, LS, and DB, there is in the control circuit delay relay coil TD which, when energized by closing of the contactor 14 actuated by the low speed relay coil LS, closes its contactor 15 in circuit with the dynamic braking relay coil DB. Of course, after the pre-set time delay, said coil TD is deenergized to open its contactor 15 to deenergize the dynamic braking coil DB. The time delay relay TD may be of the inductive, electronic, dashpot, mercury, thermal, mechanical, escapement, motor-driven, or other type, its primary function being to disconnect the D. C. excitation at the end of the braking period to preclude overheating of the motor windings.

In circuit with the high speed coil HS is a starting switch 16 and in parallel with the starting switch contacts is a holding contactor 17 which is closed by the energization of the high speed coil HS whereby the operator need not hold the starting switch 16 in depressed position once the motor has been energized.

In circuit with both the high speed and low speed coils HS and LS is a device 19 which may be termed a "measuring device" or auxiliary control device and which includes therein a stop switch 20 and a transfer switch 21 in series, the former being operative to open the motor circuit and the latter being operative to selectively include the high speed coil HS or the low speed coil LS in the control circuit.

Following is a step-by-step analysis of the mode of operation of the present invention.

With the stop switch 20 in the closed position and with the transfer switch 21 in the position shown, the operator initiates high speed operation of the motor M simply by closing the starting switch 16 which energizes the high speed coil HS, the energization of said coil closing its contactor 10 in the A. C. power source L1, L2, L3 to cause the motor M to operate at high speed and also closes its holding contactor 17 whereby the operator can release the starting switch 16 to open position. Accordingly, the motor M will operate at its top rated speed to drive a mechanism (not shown) operatively connected thereto.

When the time comes to terminate the high speed operation of the motor M and an instant before the final desired stop position is reached, the A. C. voltage is automatically transferred by shifting of the transfer switch 21 in the so-called "measuring device" or auxiliary control means 19 from the high speed relay circuit to the low speed relay circuit. In other words, the transfer switch 21 is shifted to close the circuit which includes the low speed coil LS and at the same time to open the circuit which includes the high speed coil HS. The high speed and holding contactors 10 and 17 are thus opened and the low speed contactors 11 and 14 are closed to cause low speed operation of the motor M through its low speed winding and energization of the time delay relay TD which immediately closes its contactor 15 to energize the dynamic braking relay DB, thus closing its contactors 12 and 13. For example, the motor M may have a normal speed differential of 3:1 (such as 1800:600 R. P. M.). The motor will immediately slow down by regenerative braking since the rotor is at that time rotating above the synchronous speed of the low speed winding.

Therefore, at the same instant that the A. C. voltage is transferred from the high to the low speed winding of the motor M as aforesaid, D. C. voltage is applied to one phase of the high speed winding thereby immediately producing a dynamic braking effect to further assist in deceleration of the motor M. At this point, the dynamic braking effect develops a greater torque than that of the low speed winding and therefore the motor M will continue to decellerate to a speed below that at which it would operate if only the A. C. voltage were applied to the low speed winding. Thus, by proper D. C. voltage adjustment a crawling or creeping speed may be obtained, for example, between 9 R. P. M. and 90 R. P. M. in the 1800:600 R. P. M. motor here given as an example. In other words, a torque balance will occur between the A. C. torque of the motor M from the A. C. excitation of the low speed winding and the D. C. excitation of the high speed winding. At this point of torque balance, the motor M will continue to advance at a crawling or creeping speed until transfer switch 21 is actuated by photocell, mechanical or other control (not shown) activated by the motor driven part of the machine to immediately disconnect the A. C. voltage from the low speed winding and since the D. C. voltage is yet being applied, the motor M will come to an instantaneous stop to achieve precision positioning of the part driven thereby.

As previously mentioned, the time delay relay coil TD is incorporated in the circuit to disconnect the D. C. excitation of the high speed winding after zero speed is reached and soon enough to preclude overheating of the windings.

Because a wide speed differential such as 200:1 as above indicated may be obtained with the present electric motor control device and method of control, extremely accurate positioning of machine parts for ply stock cutting, splicing, etc. can be obtained automatically by the use of a conventional two-speed, two-winding A. C. induction motor M.

Figure 2:
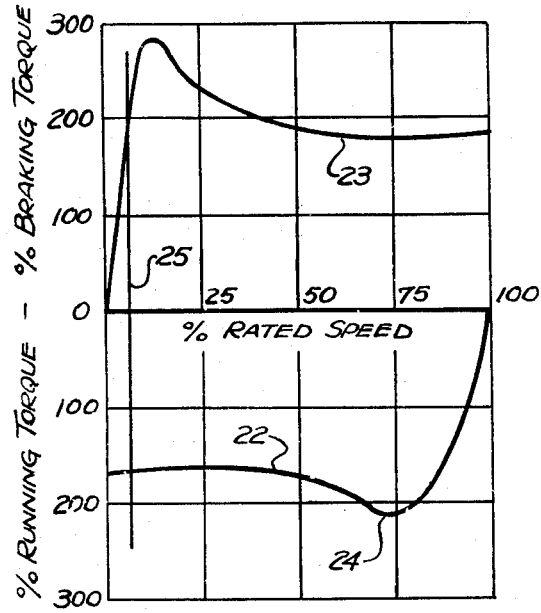
Fig. 2 shows speed-torque curves for the braking torque and the running torque.

In Fig. 2 are shown two curves 22 and 23, the curve 22 being the percent running torque of the low speed winding plotted against percent rated speed and being of the usual form, that is, showing zero torque at synchronous speed which increases with slip to the "breakdown" torque indicated at 24 occurring at about 25% slip and which then decreases as the slip increases above 25%; and the curve 23 being the percent braking torque plotted against percent rated speed and as shown such braking torque reaches its maximum value at about 85% slip (or 15% rated speed) and sharply drops to zero at 100% slip (or 0% rated speed). The line 25 is where torque balance occurs and if the A. C. excitation is there cut off (crawling or creeping speed), the braking torque will instantaneously stop the motor at a precise desired position of the machine part actuated thereby.

Figure 3:
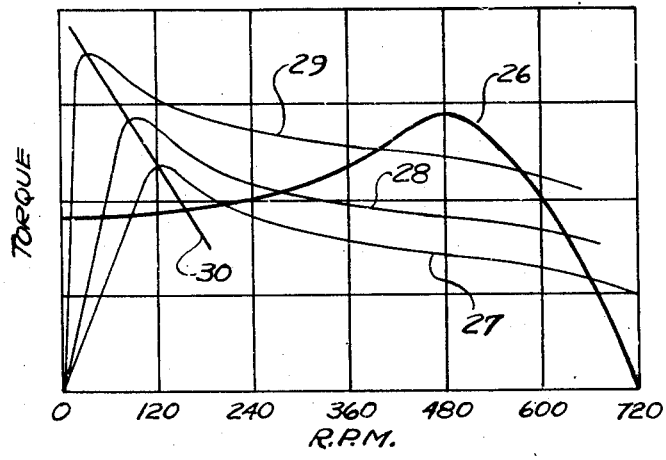
Fig. 3 shows a series of curves with revolutions per minute plotted against torque.

In Fig. 3, the curve 26 is the A. C. turning torque plotted against the R. P. M., 720 being the synchronous speed, and the curves 27, 28, and 29 are the D. C. dynamic braking curves with different degrees of D. C. excitation as indicated by line 30. As shown, the torque balance will occur here at 10 to 90 R. P. M., depending upon the D. C. excitation.

As above mentioned, this type of electric motor control has particular utility in instances where quick stopping and accurate positioning of machine parts are required. On heavy duty cycles forced ventilation of the motor M is desirable whereas on light duty cycles auxiliary cooling may be dispensed with. It will be obvious to those skilled in the art that other than two-speed, two-winding A. C. induction motors may be substituted. The present control may be arranged to continue operation of the motor at the crawling speed simply by continuing both D. C. excitation of the high speed winding and the A. C. excitation of the low speed winding.

Other modes of applying the principle of the invention may be employed, change being made as regards the details described, provided the features stated in any of the following claims, or the equivalent of such, be employed.

I therefore particularly point out and distinctly claim as my invention:

1. The combination with an A. C. induction motor having high speed and low speed windings, of a source of D. C. and switch means effective to simultaneously: (a) disconnect said high speed winding from its A. C. excitation; (b) energize said low speed winding with A. C. excitation; and (c) energize said high speed winding with D. C., whereby to create simultaneous dynamic and regenerative braking effects in said motor for rapid deceleration from its high speed to a speed substantially less than its low speed.

2. The combination with an A. C. induction motor having high speed and low speed windings, of a source of D. C. and switch means effective to simultaneously: (a) disconnect said high speed winding from its A. C. excitation; (b) energize said low speed winding with A. C. excitation; and (c) energize said high speed winding with D. C., whereby to create simultaneous dynamic and regenerative braking effects in said motor for rapid deceleration from its high speed to a speed substantially less than its low speed, said switch means, after a predetermined time, being then effective to deenergize said low speed winding whereby to arrest the rotation of the motor armature at a predetermined position.

3. The combination with an A. C. induction motor having high speed and low speed windings, of A. C. and D. C. power sources and switch means effective when actuated to transfer the A. C. power source from the high speed winding to the low speed winding of said motor and at the same time to connect the D. C. power source to the high speed winding whereby to create simultaneous dynamic and regenerative braking effects in said motor for rapid deceleration from its high speed to a speed substantially less than its low speed.

4. The combination with an A. C. induction motor having high speed and low speed windings, of A. C. and D. C. power sources and switch means effective when actuated to transfer the A. C. power source from the high speed winding to the low speed winding of said motor and at the same time to connect the D. C. power source to the high speed winding whereby to create simultaneous dynamic and regenerative braking effects in said motor for rapid deceleration from its high speed to a speed substantially less than its low speed, said switch means when further actuated being effective to disconnect the A. C. power source from the low speed winding while the D. C. power source remains connected to the high speed winding whereby said motor is instantaneously stopped at a precise desired position corresponding to the position thereof at the time of such further actuation of said switch means.

5. The combination with an A. C. induction motor having high speed and low speed windings, of A. C. and D. C. power sources and switch means effective when actuated to transfer the A. C. power source from the high speed winding to the low speed winding of said motor whereby to create a regenerative braking effect in said motor and to connect the D. C. power source to the high speed winding while the motor is running at a speed exceeding its low speed whereby to create, in addition to the aforesaid regenerative braking effect, a dynamic braking effect in said motor for decelerating said motor to a speed substantially less than its low speed.

6. The combination with an A. C. induction motor having high speed and low speed windings, of A. C. and D. C. power sources and switch means effective when actuated to transfer the A. C. power source from the high speed winding to the low speed winding of said motor whereby to create a regenerative braking effect in said motor and to connect the D. C. power source to the high speed winding while the motor is running at a speed exceeding its low speed whereby to create, in addition to the aforesaid regenerative braking effect, a dynamic braking effect in said motor for decelerating said motor to a speed substantially less than its low speed, said switch means when further actuated being effective to disconnect the A. C. power source from the low speed winding while the D. C. power source remains connected to the high speed winding whereby said motor is instantaneously stopped at a precise desired position corresponding to the position thereof at the time of such further actuation of said switch means.

References Cited in the file of this patent

UNITED STATES PATENTS

| Number | Name | Date |
|---|---|---|
| 1,215,184 | Pauly | Feb. 6, 1917 |
| 1,503,245 | Reed | July 29, 1925 |
| 1,551,529 | MacMillan | Aug. 25, 1925 |
| 1,669,518 | Higbie | May 15, 1928 |
| 1,743,772 | Harrington | Jan. 14, 1930 |
| 1,748,078 | Prantl | Feb. 25, 1930 |